United States Patent [19]
Fasano et al.

[11] Patent Number: 5,201,948
[45] Date of Patent: Apr. 13, 1993

[54] METHOD FOR IMPROVING SCRUB RESISTANCE

[75] Inventors: David M. Fasano, Maple Glen; Linus W. Linder, Lansdale; Elmer Williams, Jr., King of Prussia, all of Pa.

[73] Assignee: Rohm and Haas Company, Philadelphia, Pa.

[21] Appl. No.: 705,471

[22] Filed: May 24, 1991

[51] Int. Cl.$^5$ ............................................. C08L 101/00
[52] U.S. Cl. ..................................... 106/311; 106/499
[58] Field of Search ................................. 106/311, 499

[56] References Cited

U.S. PATENT DOCUMENTS 4,219,454  8/1980  Iacoviello et al. ................... 524/812

OTHER PUBLICATIONS

L. J. Bowman & M. Palmer, "Styrene Acrylic Binder for Decorative Emulsive Paints" (Paint & Resin, pp. 13-15, Aug. 1987).

J. C. Legg & M. H. Edser "Changing W. German Emulsion paint trends?—The requisite binders are already to hand" (Duropean Supplement to Polymer & Paoitn Color Journal pp. 56-61, Oct. 1, 1980).

D. S. W. Dargan & J. Hemmings, "High binders in Decorative Emulsion Paints". (Journal of Oil and Color Chemists Association, 70, 7, pp. 183-188, 1987.

Primary Examiner—Mark L. Bell
Assistant Examiner—Scott L. Hertzog
Attorney, Agent, or Firm—Wendy A. Taylor

[57] ABSTRACT

A method of improving the scrub resistance of a paint is provided. The method involves adding to a paint containing at least one polymeric binder having a glass transition temperature greater than about 20° C. and an average particle size diameter of from about 70 nanometers to about 150 nanometers when said binder is formed from at least one acrylic monomer or from about 100 nanometers to about 50 nanometers when said binder is formed from at least 50% by weight of vinyl acetate, at least one coalescent at a concentration of at least about 10% by weight based on the weight of the polymeric binder and where said coalescent is a solvent for the polymeric binder. The method is particularly useful for improving the scrub resistance of flat latex paints.

8 Claims, No Drawings

METHOD FOR IMPROVING SCRUB RESISTANCE

FIELD OF THE INVENTION

This invention relates to a method for improving aqueous coatings. More particularly, the invention is directed to a method for improving the scrub resistance of a paint containing a polymeric binder having a selected degree of hardness and particle size by the addition of a coalescent useful in assisting the film formation process. The improved method is particularly useful in flat latex paints.

BACKGROUND OF THE INVENTION

Interior flat latex paints constitute a significant segment of the paint market. Interior flat aqueous based paints, used for painting walls and ceilings, typically contain a film forming polymeric binder system, high concentrations of opacifying pigments and other additives, such as for example, extenders, thickeners, coalescents and rheology modifiers. The pigment provides the paint with certain desired properties, such as for example hiding, sheen, and color, while the polymeric binder provides the paint with its final film integrity.

Conventional polymeric binder systems used in interior flat latex paints are soft polymers which are formulated with water and coalescing cosolvents. After the paint is applied to the substrate surface, the coalescing cosolvent, referred to as "coalescent", and water evaporate from the paint, and the polymeric binder forms a film containing the pigment and non-volatile additives. The ability of the polymeric binder to form a useful film is critical for the final performance of the paint.

The hardness of the polymeric binder is dependent upon the glass transition temperature (referred to hereinafter as the "$T_g$") of the polymer. A polymer will not form a film if the ambient temperature which the paint is exposed to upon application to the substrate is lower than the $T_g$ of the polymeric binder. Therefore, the lower the $T_g$ of the polymer, the softer the polymer, and the lower the minimum film formation temperature at which the polymer will form a film upon drying. The ability of a polymeric binder to form a film upon drying is critical because it dictates the minimum temperature at which the paint can be applied to a substrate surface. If the ambient temperature at which the paint is be applied to a substrate is lower than the $T_g$ of the polymeric binder, the ability of the paint to form a useful film upon drying is reduced or possibly eliminated. The minimum film formation temperature and $T_g$ of the polymeric binder are therefore very important when formulating an aqueous latex based paint for use in low temperature environments, such as for example, new construction.

Coalescents are known to be useful for lowering the minimum film formation temperature of polymeric based coatings. The coalescent must be volatile at the temperatures at which the paint is to be applied and soluble in the polymeric binder. Because of the solubility of the coalescent in the polymer, the coalescent acts to effectively lower the apparent $T_g$ of the polymer. The coalescent evaporates from the paint upon drying eventually producing a film of hardness similar to the original glass transition temperature of the polymer. The coalescents are typically used in interior flat paints at concentrations less than about 10% based on the weight of the binder, and more typically on the order of about 3% to 7% based on the weight of binder.

Abrasive scrub resistance is an important property for paints, particularly for latex or aqueous based polymeric paints used on interior surfaces. The ability of a paint film to withstand abrasive scrubbing is a function of the concentration and type of pigments and extenders employed in the formulation, as well as the hardness and particle size of the polymeric binder. Decreasing the pigment volume concentration (referred to hereinafter as "PVC") of a paint formulation can be employed to improve the scrub resistance of the paint. However, this approach is inefficient for two reasons. First, it is more costly due to the increased binder required to replace the relatively less expensive extenders which have been removed. Second, the hiding ability of the coating may be decreased, particularly in high PVC paints.

The softer the paint film is, the lower its abrasive scrub resistance will be. However, increasing the polymer hardness reduces the film formation properties and hence the application window for the formulated paint. This invention employs a polymer with increased hardness yet without reducing the film formation properties.

The particle size of the polymeric binder also has an effect on the scrub resistance of the paint film. Increasing the particle size of the polymer generally decreases the abrasive scrub resistance of the paint, while reducing the particle size of the polymeric binder can improve the abrasive scrub resistance. Reducing the particle size of the polymeric binder, however, typically requires increasing the concentration of surfactants used in conducting the emulsion polymerization process used to make the polymer, with an attendant increase in the surfactant concentration in the paint formulation. Increasing the concentration of surfactants in the paint formulation, however, reduces the abrasive scrub resistance of the paint because surfactants increase the water sensitivity of the paint film.

DESCRIPTION OF THE PRIOR ART

U.S. Pat. No. 4,219,454 teaches a paint composition and a process for forming vinyl acetate copolymers useful in interior flat and semi-gloss paints. The composition comprises water, pigment and a latex comprising from about 40 to 70% of film forming polymerized resin particles containing at least 25% of vinyl acetate by weight, from about 5 to 20% of a monomer selected from the group consisting of ethylene and a lower alkyl acrylate and optionally 0.2 to 2.5% of a wet adhesion monomer. The latex polymer particles have a particle size within the range of 300–650 nm which impart good leveling and flow to the latex polymer emulsion.

L. J. Bowman and M. Palmer, "Styrene Acrylic Binder for Decorative Emulsion Paints" (*Paint & Resin*, pp. 13–15, August 1987) disclose styreneacrylic copolymers for interior and exterior flat and textured coatings for use at 65 to 85% pigment volume concentration. The reference discloses a styrene acrylic copolymer which has a minimum film formation temperature (MFFT) of 3° C. with 1.5% by weight of White Spirit coalescent and a MFFT less than 0° C. with 3.0% by weight of coalescent. The reference reports that styrene-acrylic copolymers have not only superior scrub resistance compared to vinyl acetate/vinyl versatate high binders, but also cost savings over vinyl acetate/vinyl versatate high binders and vinyl acetate/vinyl chloride/ethylene terpolymers.

J. C. Legg and M. H. Edser, "Changing W. German emulsion paint trends?—the requisite binders are already to hand" (European Supplement to *Polymers Paint Colour Journal*, pp. 56–61, Oct. 1, 1980) disclose that West German interior emulsion paints have been formulated at 80–90% pigment volume concentration and have favored styrene-acrylic and all acrylic binders. It also discloses that at pigment volume concentrations of 20–30%, styrene-acrylic and all acrylic binders are less satisfactory for flow at low-medium pigment loadings and for cost effectiveness.

D. S. W. Dargan and J. Hemmings, "High binders in decorative emulsion paints," (*Journal of Oil and Colour Chemists Association*, 70, 7, pp. 183–8, 1987), disclose the use of 20% VeoVa® (vinyl esters of synthetic branched chain fatty acids)/80% vinyl acetate high binding copolymers in interior and exterior decorative paints. The reference teaches away from the use of harder polymeric binders and towards the use of softer, easier filming polymeric binders. In addition, it suggests that an increased level of coalescent has a deleterious effect on scrub resistance.

Therefore, it is an object of the present invention to provide a method for improving the scrub resistance of aqueous based coatings, particularly flat latex paints.

It is also an object of the present invention to provide a method for improving the scrub resistance of aqueous-based paints, particularly flat latex paints, without increasing the cost of the paint formulation.

SUMMARY OF THE INVENTION

A method of improving the scrub resistance of a paint is provided. The method involves adding to a paint containing at least one polymeric binder having a glass transition temperature greater than about 20° C. and an average particle size diameter of from about 70 nanometers to about 150 nanometers when said binder is formed from at least one acrylic monomer or from about 100 nanometers to about 250 nanometers when said binder is formed from at least 50% by weight of vinyl acetate, at least one coalescent at a concentration of at least about 10% by weight based on the weight of the polymeric binder and where said coalescent is a solvent for the polymeric binder. The method is particularly useful for improving the scrub resistance of flat latex paints.

DETAILED DESCRIPTION OF THE INVENTION

"Latex" as used herein refers to a water-insoluble polymer which may be prepared by conventional polymerization techniques such as, for example, by emulsion polymerization. "Glass transition temperature," or "$T_g$," as used herein means the glass transition temperature of a polymer as calculated by the Fox equation [*Bulletin of American Physics Society* 1, 3, page 123 (1956)]:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers and $T_{g(1)}$ and $T_{g(2)}$ refer to the glass transition temperatures of the two corresponding homopolymers. The pigment volume concentration ("PVC") used herein is calculated by $$PVC = \frac{V_p}{V_p + V_b} \times 100$$

$$V_p = V_{TiO2} + V_e$$

where
$V_p$ = volume of pigment(s),
$V_b$ = volume of binder(s),
$V_e$ = volume of extender(s),
$V_{TiO2}$ = volume of titanium dioxide.

Contrary to the teachings and suggestions in the art, we have found that polymers which are harder than those conventionally employed as binders in aqueous based interior paints can be used to improve abrasive scrub resistance. This finding was the result of the selection of the combined performance properties of such harder polymers with higher concentrations of coalescing solvents. The combination of harder polymeric binders and increased concentrations of coalescing solvents has been found to efficiently improve the scrub resistance of aqueous based interior latex paints than was heretofore accomplished by other techniques and without some of the other attendant disadvantages of such techniques.

One critical aspect of the present invention is the selection of suitable polymers for the polymeric binder system. We have found that the most important factors in selecting polymers for use as binders in such paint formulations are:
(1) the hardness of the polymer,
(2) the composition of the polymer, and
(3) the particle size of the polymer.

We have improved the abrasive scrub resistance for aqueous based coatings, particularly interior flat latex paints, which contain polymeric binders having a $T_g$ greater than about 20° C. with the addition of higher concentrations of coalescent. Such polymers are not conventional film forming binders since the $T_g$'s of such polymers are significantly higher than the $T_g$'s of soft polymeric binders typically employed in interior paints. A polymeric binder having a $T_g$ of greater than about 20° C. would not ordinarily be selected because it would not be expected to form films at ambient temperatures.

In this regard, we have found that the polymeric binders of this invention may be formed from any monoethylenically unsaturated vinyl monomer or mixture of said monomers which yields a polymer with a $T_g$ of greater than about 20° C. in the dried state. Suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate; alkyl esters of a,b-unsaturated dicarboxylic acids: dibutyl maleate, dibutyl fumarate, dioctyl maleate, dibutyl itaconate; vinyl chloride; vinyl esters: vinyl acetate, versatic acid vinyl esters, vinyl butyrate, vinyl propionate; vinyl ethers: methylvinyl ether, n-butyl vinyl ether; unsaturated carboxylic acids and amides:

acrylic acid, methacrylic acid, acrylamide, methacrylamide; itaconic acid, maleic acid, fumaric acid, methacrylonitrile, styrene, substituted styrenes, butadiene, acrylonitrile, methacrylonitrile, ethylene, N-vinyl pyrrolidone and the like may be used.

We have found that copolymers formed from butyl acrylate and methyl methacrylate and copolymers formed from 80% by weight vinyl acetate and 20% by weight vinyl chloride are the preferred polymeric binders.

In addition to the hardness of the polymeric binder, we have also found that the particle size of the polymeric binder has an effect on the scrub resistance of flat latex paints. We have found it desirable to employ polymeric binders where said binders are formed from at least one acrylic monomer and which have an average particle size diameter of from about 70 nanometers to about 150 nanometers and preferably from about 80 nanometers to about 120 nanometers. We have also found it desirable to employ polymeric binders which are formed from at least 50% by weight of vinyl acetate and which have an average particle size diameter of from about 100 nanometers to about 250 nanometers and preferably from about 150 nanometers to about 200 nanometers.

We have found that the increase in scrub resistance achieved by reducing the average particle size of the polymeric binder is somewhat offset by the additional surfactant needed during the polymerization of the polymeric binder. However, it is essential to minimize the amount of surfactant used to control the particle size because of the detrimental effect surfactants have on the final film properties, including water resistance and scrub resistance.

Another critical factor in the selection of suitable polymeric binders of the present invention is the selection of a suitable coalescent. The coalescent must be a solvent for the polymeric binder. Suitable coalescents include Texanol® (2,2,4-trimethyl-3-hydroxypentyl acetate), propylene glycol methyl ether, propylene glycol methyl ether acetate, dipropylene glycol monomethyl ether, diethylene glycol ethyl ether, ethylene glycol phenyl ether, propylene glycol n-butyl ether, dipropylene glycol butoxy ether, propylene glycol phenyl ether, diethylene glycol n-butyl ether, diethylene glycol monobutyl ether, diethylene glycol mono-n-hexyl ether, ethylene-diethylene glycol 2-ethyl hexyl ether, tripropylene glycol methyl ether, oxo-hexyl acetate, heptyl ester with $C_7$ oxo-alcohol, acetic acid ester of $C_8$ oxo-alcohol, acetic acid ester of $C_9$ oxo-alcohol, acetic acid ester of $C_{10}$-rich oxo-alcohol, acetic acid ester of $C_{13}$-rich oxo-alcohol, dicyclopentadienyl glycol ether acrylate esters, dicyclopentadienyl glycol ether (meth)acrylate esters tributyl phosphate, isodecyl benzoate, mineral spirits, white spirits, toluene, xylene and the like and mixtures thereof.

The present invention is a particularly useful method for improving coating formulations which have a pigment volume concentration from about 50 to about 90.

The coalescent must be used at a concentration greater than about 10% by weight based on the weight of the polymeric binder. It is preferred that the concentration of the coalescent be from about 15% by weight to about 35% by weight based on the weight of the polymeric binder, and more preferably in the range of from about 20% by weight to about 30% by weight based on the weight of the polymeric binder.

In addition, conventional coating components such as, for example, pigments, binders, vehicles, extenders, dispersants, surfactants, coalescents, wetting agents, rheology modifiers, thickeners, drying retarders, antifoaming agents, colorants, waxes, preservatives, heat stabilizers, ultraviolet light absorbers and the like may be used in this invention.

The following examples are intended to illustrate the invention; they are not intended to limit the invention as other applications of the invention will be obvious to those of ordinary skill in the art.

NOTE

The following abbreviations are used the examples:

| BA | butyl acrylate |
|---|---|
| cps | centipoise |
| g | gram |
| L | liter |
| MAA | methacrylic acid |
| ME | monomer emulsion |
| MMA | methyl methacrylate |
| nm | nanometer |
| SVS | sodium vinyl sulfonate |
| VA | vinyl acetate |

EXAMPLE 1

10 BA/88.5 MMA/1.5 MAA

A monomer emulsion ("ME") was prepared from 500 g deionized water, 12 g anionic surfactant, 200 g butyl acrylate, 1770 g methyl methacrylate and 30 g methacrylic acid. To a 5 L stirred reactor, 1225 g deionized water and 8 g of an anionic surfactant were added. To the stirred mixture at 80° C., 100 g of ME, 5 g ammonium persulfate in 20 g deionized water, and 3 g sodium carbonate in 100 g deionized water were added. The remainder of the ME was added over 2 hours along with a solution of 2 g ammonium persulfate in 100 g deionized water while maintaining the temperature at 78°-82° C. The final reaction mixture was cooled and neutralized to pH 9 with 28% aqueous ammonia. The emulsion polymer obtained was 49.4% solids, had a particle size of 104 nm, and had a Brookfield viscosity of 270 cps. The calculated Tg of the copolymer was 81° C.

EXAMPLE 2

20 BA/78.5 MMA/1.5 MAA

A monomer emulsion was prepared from 500 g deionized water, 12 g anionic surfactant, 400 g butyl acrylate, 1570 g methyl methacrylate and 30 g methacrylic acid. To a 5 L stirred reactor, 1225 g deionized water and 8 g of an anionic surfactant were added. To the stirred mixture at 80° C., 100 g of ME, 5 g ammonium persulfate in 20 g deionized water, and 3 g sodium carbonate in 100 g deionized water were added. The remainder of the ME was added over 2 hours along with a solution of 2 g ammonium persulfate in 100 g deionized water while maintaining the temperature at 78°-82° C. The final reaction mixture was cooled and neutralized to pH 9 with 28% aqueous ammonia. The emulsion polymer obtained was 49.3% solids, had a particle size of 108 nm, and had a Brookfield viscosity of 300 cps. The calculated Tg of the copolymer was 58° C.

EXAMPLE 3

30 BA/68.5 MMA/1.5 MAA

A monomer emulsion was prepared from 500 g deionized water, 12 g anionic surfactant, 600 g butyl acrylate, 1370 g methyl methacrylate and 30 g methacrylic acid. To a 5 L stirred reactor, 1225 g deionized water and 8 g of an anionic surfactant were added. To the stirred mixture at 80° C., 100 g of ME, 5 g ammonium persulfate in 20 g deionized water, and 3 g sodium carbonate in 100 g deionized water were added. The remainder of the ME was added over 2 hours along with a solution of 2 g ammonium persulfate in 100 g deionized water while maintaining the temperature at 78°-82° C. The final reaction mixture was cooled and neutralized to pH 9 with 28% aqueous ammonia. The emulsion polymer obtained was 49.2% solids, had a particle size of 108 nm, and had a Brookfield viscosity of 290 cps. The calculated Tg of the copolymer was 38° C.

EXAMPLE 4

40 BA/58.5 MMA/1.5 MAA

A monomer emulsion was prepared from 500 g deionized water, 12 g anionic surfactant, 800 g butyl acrylate, 1170 g methyl methacrylate and 30 g methacrylic acid. To a 5 L stirred reactor, 1225 g deionized water and 8 g of an anionic surfactant were added. To the stirred mixture at 80° C., 100 g of ME, 5 g ammonium persulfate in 20 g deionized water, and 3 g sodium carbonate in 100 g deionized water were added. The remainder of the ME was added over 2 hours along with a solution of 2 g ammonium persulfate in 100 g deionized water while maintaining the temperature at 78°-82° C. The final reaction mixture was cooled and neutralized to pH 9 with 28% aqueous ammonia. The emulsion polymer obtained was 49.4% solids, had a particle size of 108 nm, and had a Brookfield viscosity of 390 cps. The calculated Tg of the copolymer was 21° C.

EXAMPLE 5

50 BA/48.5 MMA/1.5 MAA

A monomer emulsion was prepared from 500 g deionized water, 12 g anionic surfactant, 1000 g butyl acrylate, 970 g methyl methacrylate and 30 g methacrylic acid. To a 5 L stirred reactor, 1225 g deionized water and 8 g of an anionic surfactant were added. To the stirred mixture at 80° C., 100 g of ME, 5 g ammonium persulfate in 20 g deionized water, and 3 g sodium carbonate in 100 g deionized water were added. The remainder of the ME was added over 2 hours along with a solution of 2 g ammonium persulfate in 100 g deionized water while maintaining the temperature at 78°-82° C. The final reaction mixture was cooled and neutralized to pH 9 with 28% aqueous ammonia. The emulsion polymer obtained was 49.4% solids, had a particle size of 106 nm, and had a Brookfield viscosity of 520 cps. The calculated Tg of the copolymer was 5° C.

EXAMPLE 6

35 BA/63.5 MMA/1.5 MAA

A monomer emulsion was prepared from 500 g deionized water, 12 g anionic surfactant, 700 g butyl acrylate, 1270 g methyl methacrylate and 30 g methacrylic acid. To a 5 L stirred reactor, 1229 g deionized water and 10 g of an anionic surfactant were added. To the stirred mixture at 80° C., 100 g of ME, 8.7 g ammonium persulfate in 20 g deionized water, and 4 g sodium carbonate in 100 g deionized water were added. The remainder of the ME was added over 4 hours along with a solution of 3.4 g ammonium persulfate in 100 g deionized water while maintaining the temperature at 78°-82° C. The final reaction mixture was cooled and neutralized to pH 9 with 28% aqueous ammonia. The emulsion polymer obtained was 49.4% solids, had a particle size of 108 nm, and had a Brookfield viscosity of 175 cps. The calculated Tg of the copolymer was 30° C.

EXAMPLE 7

80 VA/19.25 BA/0.75 SVS

A monomer emulsion was prepared from 600 g deionized water, 10 g anionic surfactant, 1600 g vinyl acetate, 385 g butyl acrylate and 60 g 25% sodium vinyl sulfonate. To a 5 L stirred reactor, 1240 g deionized water and 100 g of an anionic surfactant were added. To the stirred mixture at 70° C., 4 g sodium acetate, 4 g acetic acid, and 4 g ammonium persulfate in 20 g deionized water were added. The ME was added over 3 hours along with a solution of 1.5 g ammonium persulfate in 100 g deionized water while maintaining the temperature at 70°-72° C. The final reaction mixture was cooled and neutralized to pH 5.2 with 28% aqueous ammonia. The emulsion polymer obtained was 47.8% solids, had a particle size of 118 nm, and had a Brookfield viscosity of 540 cps. The calculated Tg of the copolymer was 8° C.

EXAMPLE 8

79.75 VA/20 IBOA/0.25 SVS

A monomer emulsion was prepared from 600 g deionized water, 10 g anionic surfactant, 1595 g vinyl acetate, 400 g butyl acrylate and 20 g 25% sodium vinyl sulfonate. To a 5 L stirred reactor, 1423 g deionized water and 5 g of an anionic surfactant were added. To the stirred mixture at 80° C., 4 g sodium acetate, 4 g acetic acid, and 5 g ammonium persulfate in 20 g deionized water were added. The ME was added over 3 hours along with a solution of 5 g ammonium persulfate in 100 g deionized water while maintaining the temperature at 78°-82° C. The final reaction mixture was cooled and neutralized to pH 5.6 with 28% aqueous ammonia. The emulsion polymer obtained was 46.1% solids, had a particle size of 126 nm, and had a Brookfield viscosity of 42 cps. The calculated Tg of the copolymer was 40° C.

EXAMPLE 9

79.75 VA/7 BA/13 MMA/0.25 SVS

A monomer emulsion was prepared from 600 g deionized water, 10 g anionic surfactant, 1600 g vinyl acetate, 140 g butyl acrylate, 260 g methyl methacrylate and 20 g 25% sodium vinyl sulfonate. To a 5 L stirred reactor, 1423 g deionized water and 5 g of an anionic surfactant were added. To the stirred mixture at 80° C., 4 g sodium acetate, 4 g acetic acid, and 5 g ammonium persulfate in 20 g deionized water were added. The ME was added over 3 hours along with a solution of 5 g ammonium persulfate in 100 g deionized water while maintaining the temperature at 78°-82° C. The final reaction mixture was cooled and neutralized to pH 5.9 with 28% aqueous ammonia. The emulsion polymer obtained was 46.2% solids, had a particle size of 143 nm, and had a Brookfield viscosity of 32 cps. The calculated Tg of the copolymer was 29° C.

EXAMPLE 10

FORMULATION OF PAINT SAMPLES

Note: All quantities of ingredients are listed in Tables 10.1–10.5.

The pigments (titanium dioxide) and mineral fillers (China clay, calcium carbonate and silica) were predispersed with a high speed Cowles disperser. To a 1 pint plastic paint can equipped with a laboratory stirrer, water, ethylene glycol, anionic dispersant, defoamer and base were added and mixed. The predispersed pigment and mineral fillers were then added and mixed at moderate speed. The emulsion polymer, coalescent, additional defoamer, biocide and aqueous ammonia were then added and mixed. Finally additional water and hydroxyethyl cellulose thickener were added to obtain a target viscosity of 83 to 87 Kreb units. The paint formulation was mixed for an additional 15 minutes.

The emulsion polymers of Paint Formulations 10–13 are:

| PAINT FORMULATION | EMULSION POLYMER | COMPOSITION | SUPPLIER | $T_g$ (°C.) |
|---|---|---|---|---|
| 10 | UCAR ® 367 | VA/BA | Union Carbide | 20 |
| 11 | UCAR ® 376 | VA/BA | Union Carbide | 20 |
| 12 | Unocal ® 661 | VA/BA | Union Oil | 24 |
| 13 | Unocal ® 3083 | VA/BA | Union Carbide | 20 |

TABLE 10.1

| | Paint Formulation | | | | | | |
|---|---|---|---|---|---|---|---|
| | 1A | 2A | 3A | 4A | 5A | 6A | 7A |
| Emulsion Polymer Type | Example 1 | Example 2 | Example 3 | Example 4 | Example 5 | Example 6 | Example 7 |
| Emulsion Polymer Level | 78.29 | 77.45 | 76.63 | 75.43 | 74.23 | 73.04 | 80.10 |
| Water | 75.00 | 75.00 | 75.00 | 75.00 | 75.00 | 75.00 | 75.00 |
| Ethylene glycol | 11.60 | 11.60 | 11.60 | 11.60 | 11.60 | 11.60 | 11.60 |
| Anionic dispersant (Tamol ® 850 30% total solids) | 4.57 | 4.57 | 4.57 | 4.57 | 4.57 | 4.57 | 4.57 |
| Defoamer (Colloid 643) | 1.00 | 1.00 | 1.00 | 1.00 | 1.00 | 1.00 | 1.00 |
| Base (AMP-95) | 1.00 | 1.00 | 1.00 | 1.00 | 1.00 | 1.00 | 1.00 |
| Titanium dioxide (Ti-Pure ® R-900) | 60.00 | 60.00 | 60.00 | 60.00 | 60.00 | 60.00 | 60.00 |
| China clay (Optiwhite ® P) | 41.28 | 41.28 | 41.28 | 41.28 | 41.28 | 41.28 | 41.28 |
| Calcium carbonate (Duramite ®) | 84.46 | 84.46 | 84.46 | 84.46 | 84.46 | 84.46 | 84.46 |
| Silica 1160 | 72.85 | 72.85 | 72.85 | 72.85 | 72.85 | 72.85 | 72.85 |
| Texanol ® coalescent | 1.94 | 1.92 | 1.89 | 1.86 | 1.84 | 1.89 | 1.89 |
| Defoamer (Colloid 643) | 1.00 | 1.00 | 1.00 | 1.00 | 1.00 | 1.00 | 1.00 |
| Biocide (Nuosept ® 95) | 0.50 | 0.50 | 0.50 | 0.50 | 0.50 | 0.50 | 0.50 |
| Hydroxyethyl cellulose (Natrosol ® 250 MHR 2.5%) | 96.58 | 98.15 | 97.31 | 99.98 | 98.90 | 99.47 | 100.83 |
| Aqueous ammonia | 1.00 | 1.00 | 1.00 | 1.00 | 1.00 | 1.00 | 1.00 |
| Water | 59.52 | 58.40 | 59.62 | 57.56 | 59.32 | 61.05 | 53.10 |

| | Paint Formulation | | | |
|---|---|---|---|---|
| | 10A | 11A | 12A | 13A |
| Emulsion Polymer Type | UCAR ® 367 | UCAR ® 376 | Unocal ® 661 | Unocal ® 3083 |
| Emulsion Polymer Level | 68.78 | 68.98 | 69.48 | 69.50 |
| Water | 75.00 | 75.00 | 75.00 | 75.00 |
| Ethylene glycol | 11.60 | 11.60 | 11.60 | 11.60 |
| Anionic dispersant (Tamol ® 850 30% total solids) | 4.57 | 4.57 | 4.57 | 4.57 |
| Defoamer (Colloid 643) | 1.00 | 1.00 | 1.00 | 1.00 |
| Base (AMP-95) | 1.00 | 1.00 | 1.00 | 1.00 |
| Titanium dioxide (TiPure ® R-900) | 60.00 | 60.00 | 60.00 | 60.00 |
| China clay (Optiwhite ® P) | 41.28 | 41.28 | 41.28 | 41.28 |
| Calcium carbonate (Duramite ®) | 84.46 | 84.46 | 84.46 | 84.46 |
| Silica 1160 | 72.85 | 72.85 | 72.85 | 72.85 |
| Texanol ® coalescent | 1.89 | 1.90 | 1.90 | 1.89 |
| Defoamer (Colloid 643) | 1.00 | 1.00 | 1.00 | 1.00 |
| Biocide (Nuosept ® 95) | 0.50 | 0.50 | 0.50 | 0.50 |
| Hydroxyethyl cellulose (Natrosol ® 250 MHR 2.5%) | 102.35 | 100.66 | 105.65 | 106.20 |
| Aqueous ammonia | 1.00 | 1.00 | 1.00 | 1.00 |
| Water | 62.37 | 62.80 | 58.55 | 57.85 |

Note: All quantities in grams 5% coalescent

TABLE 10.2

| | Paint Formulation | | | | | | |
|---|---|---|---|---|---|---|---|
| | 1B | 2B | 3B | 4B | 5B | 6B | 7B |
| Emulsion Polymer Type | Example 1 | Example 2 | Example 3 | Example 4 | Example 5 | Example 6 | Example 7 |
| Emulsion Polymer Level | 78.29 | 77.45 | 76.63 | 75.43 | 74.23 | 73.04 | 80.10 |
| Water | 75.00 | 75.00 | 75.00 | 75.00 | 75.00 | 75.00 | 75.00 |

TABLE 10.2-continued

| | | | | | | | |
|---|---|---|---|---|---|---|---|
| Ethylene glycol | 11.60 | 11.60 | 11.60 | 11.60 | 11.60 | 11.60 | 11.60 |
| Anionic dispersant (Tamol ® 850 30% total solids) | 4.57 | 4.57 | 4.57 | 4.57 | 4.57 | 4.57 | 4.57 |
| Defoamer (Colloid 643) | 1.00 | 1.00 | 1.00 | 1.00 | 1.00 | 1.00 | 1.00 |
| Base (AMP-95) | 1.00 | 1.00 | 1.00 | 1.00 | 1.00 | 1.00 | 1.00 |
| Titanium dioxide (Ti-Pure ® R-900) | 60.00 | 60.00 | 60.00 | 60.00 | 60.00 | 60.00 | 60.00 |
| China clay (Optiwhite ® P) | 41.28 | 41.28 | 41.28 | 41.28 | 41.28 | 41.28 | 41.28 |
| Calcium carbonate (Duramite ®) | 84.46 | 84.46 | 84.46 | 84.46 | 84.46 | 84.46 | 84.46 |
| Silica 1160 | 72.85 | 72.85 | 72.85 | 72.85 | 72.85 | 72.85 | 72.85 |
| Texanol ® coalescent | 5.81 | 5.75 | 5.68 | 5.59 | 5.51 | 5.68 | 5.76 |
| Defoamer (Colloid 643) | 1.00 | 1.00 | 1.00 | 1.00 | 1.00 | 1.00 | 1.00 |
| Biocide (Nuosept ® 95) | 0.50 | 0.50 | 0.50 | 0.50 | 0.50 | 0.50 | 0.50 |
| Hydroxyethyl cellulose (Natrosol ® 250 MHR 2.5%) | 97.95 | 96.41 | 94.73 | 95.43 | 98.63 | 98.99 | 97.83 |
| Aqueous ammonia | 1.00 | 1.00 | 1.00 | 1.00 | 1.00 | 1.00 | 1.00 |
| Water | 54.12 | 56.12 | 58.25 | 58.26 | 55.75 | 57.55 | 52.10 |

| | Paint Formulation | | | |
|---|---|---|---|---|
| | 10B | 11B | 12B | 13B |
| Emulsion Polymer Type | UCAR ® 367 | UCAR ® 376 | Unocal ® 661 | Unocal ® 3083 |
| Emulsion Polymer Level | 68.78 | 68.98 | 69.48 | 69.50 |
| Water | 75.00 | 75.00 | 75.00 | 75.00 |
| Ethylene glycol | 11.60 | 11.60 | 11.60 | 11.60 |
| Anionic dispersant (Tamol ® 850 30% total solids) | 4.57 | 4.57 | 4.57 | 4.57 |
| Defoamer (Colloid 643) | 1.00 | 1.00 | 1.00 | 1.00 |
| Base (AMP-95) | 1.00 | 1.00 | 1.00 | 1.00 |
| Titanium dioxide (Ti-Pure ® R-900) | 60.00 | 60.00 | 60.00 | 60.00 |
| China clay (Optiwhite ® P) | 41.28 | 41.28 | 41.28 | 41.28 |
| Calcium carbonate (Duramite ®) | 84.46 | 84.46 | 84.46 | 84.46 |
| Silica 1160 | 72.85 | 72.85 | 72.85 | 72.85 |
| Texanol ® coalescent | 5.67 | 5.69 | 5.69 | 5.67 |
| Defoamer (Colloid 643) | 1.00 | 1.00 | 1.00 | 1.00 |
| Biocide (Nuosept ® 95) | 0.50 | 0.50 | 0.50 | 0.50 |
| Hydroxyethyl cellulose (Natrosol ® 250 MHR 2.5%) | 101.13 | 101.57 | 97.65 | 97.28 |
| Aqueous ammonia | 1.00 | 1.00 | 1.00 | 1.00 |
| Water | 59.63 | 57.90 | 62.55 | 62.78 |

Note: All quantities in grams 15% coalescent

TABLE 10.3

| | Paint Formulation | | | | | | |
|---|---|---|---|---|---|---|---|
| | 1C | 2C | 3C | 4C | 5C | 6C | 7C |
| Emulsion Polymer Type | Example 1 | Example 2 | Example 3 | Example 4 | Example 5 | Example 6 | Example 7 |
| Emulsion Polymer Level | 78.29 | 77.45 | 76.63 | 75.43 | 74.23 | 73.04 | 80.10 |
| Water | 75.00 | 75.00 | 75.00 | 75.00 | 75.00 | 75.00 | 75.00 |
| Ethylene glycol | 11.60 | 11.60 | 11.60 | 11.60 | 11.60 | 11.60 | 11.60 |
| Anionic dispersant (Tamol ® 850 30% total solids) | 4.57 | 4.57 | 4.57 | 4.57 | 4.57 | 4.57 | 4.57 |
| Defoamer (Colloid 643) | 1.00 | 1.00 | 1.00 | 1.00 | 1.00 | 1.00 | 1.00 |
| Base (AMP-95) | 1.00 | 1.00 | 1.00 | 1.00 | 1.00 | 1.00 | 1.00 |
| Titanium dioxide (Ti-Pure ® R-900) | 60.00 | 60.00 | 60.00 | 60.00 | 60.00 | 60.00 | 60.00 |
| China clay (Optiwhite ® P) | 41.28 | 41.28 | 41.28 | 41.28 | 41.28 | 41.28 | 41.28 |
| Calcium carbonate (Duramite ®) | 84.46 | 84.46 | 84.46 | 84.46 | 84.46 | 84.46 | 84.46 |
| Silica 1160 | 72.85 | 72.85 | 72.85 | 72.85 | 72.85 | 72.85 | 72.85 |
| Texanol ® coalescent | 9.69 | 9.58 | 9.47 | 9.32 | 9.18 | 9.46 | 9.59 |
| Defoamer (Colloid 643) | 1.00 | 1.00 | 1.00 | 1.00 | 1.00 | 1.00 | 1.00 |
| Biocide (Nuosept ® 95) | 0.50 | 0.50 | 0.50 | 0.50 | 0.50 | 0.50 | 0.50 |
| Hydroxyethyl cellulose (Natrosol ® 250 MHR 2.5%) | 99.26 | 95.80 | 97.18 | 95.59 | 96.87 | 98.02 | 96.00 |
| Aqueous ammonia | 1.00 | 1.00 | 1.00 | 1.00 | 1.00 | 1.00 | 1.00 |
| Water | 48.72 | 52.65 | 51.75 | 54.15 | 53.66 | 54.54 | 49.90 |

| | Paint Formulation | | | |
|---|---|---|---|---|
| | 10C | 11C | 12C | 13C |
| Emulsion Polymer Type | UCAR ® 367 | UCAR ® 376 | Unocal ® 661 | Unocal ® 3083 |
| Emulsion Polymer Level | 68.78 | 68.98 | 69.48 | 69.50 |
| Water | 75.00 | 75.00 | 75.00 | 75.00 |
| Ethylene glycol | 11.60 | 11.60 | 11.60 | 11.60 |
| Anionic dispersant (Tamol ® 850 30% total solids) | 4.57 | 4.57 | 4.57 | 4.57 |

TABLE 10.3-continued

|  | | | | |
|---|---|---|---|---|
| Defoamer (Colloid 643) | 1.00 | 1.00 | 1.00 | 1.00 |
| Base (AMP-95) | 1.00 | 1.00 | 1.00 | 1.00 |
| Titanium dioxide (Ti-Pure ® R-900) | 60.00 | 60.00 | 60.00 | 60.00 |
| China clay (Optiwhite ® P) | 41.28 | 41.28 | 41.28 | 41.28 |
| Calcium carbonate (Duramite ®) | 84.46 | 84.46 | 84.46 | 84.46 |
| Silica 1160 | 72.85 | 72.85 | 72.85 | 72.85 |
| Texanol ® coalescent | 9.46 | 9.48 | 9.48 | 9.46 |
| Defoamer (Colloid 643) | 1.00 | 1.00 | 1.00 | 1.00 |
| Biocide (Nuosept ® 95) | 0.50 | 0.50 | 0.50 | 0.50 |
| Hydroxyethyl cellulose (Natrosol ® 250 MHR 2.5%) | 96.15 | 96.18 | 98.80 | 98.43 |
| Aqueous ammonia | 1.00 | 1.00 | 1.00 | 1.00 |
| Water | 60.60 | 59.35 | 57.40 | 57.60 |

Note: All quantities in grams 25% coalescent

TABLE 10.4

|  | Paint Formulation | |
|---|---|---|
|  | 8D | 9D |
| Emulsion Polymer Type | Example 8 | Example 9 |
| Emulsion Polymer Level | 82.95 | 84.66 |
| Water | 75.00 | 75.00 |
| Ethylene glycol | 11.60 | 11.60 |
| Anionic dispersant (Tamol ® 850 30% total solids) | 4.57 | 4.57 |
| Defoamer (Colloid 643) | 1.00 | 1.00 |
| Base (AMP-95) | 1.00 | 1.00 |
| Titanium dioxide (Ti-Pure ® R-900) | 60.00 | 60.00 |
| China clay (Optiwhite ® P) | 41.28 | 41.28 |
| Calcium carbonate (Duramite ®) | 84.46 | 84.46 |
| Silica 1160 | 72.85 | 72.85 |
| Texanol ® coalescent | 3.85 | 3.92 |
| Defoamer (Colloid 643) | 1.00 | 1.00 |
| Surfactant (Triton ® GR-7M) | 0.37 | 0.37 |
| Biocide (Nuosept ® 95) | 0.50 | 0.50 |
| Hydroxyethyl cellulose (Natrosol ® 250 MHR 2.5%) | 91.21 | 92.91 |
| Aqueous ammonia | 1.00 | 1.00 |
| Water | 62.81 | 60.17 |

Note: All quantities in grams 10% coalescent

TABLE 10.5

|  | Paint Formulation | |
|---|---|---|
|  | 8E | 9E |
| Emulsion Polymer Type | Example 8 | Example 9 |
| Emulsion Polymer Level | 82.95 | 84.66 |
| Water | 75.00 | 75.00 |
| Ethylene glycol | 11.60 | 11.60 |
| Anionic dispersant (Tamol ® 850 30% total solids) | 4.57 | 4.57 |
| Defoamer (Colloid 643) | 1.00 | 1.00 |
| Base (AMP-95) | 1.00 | 1.00 |
| Titanium dioxide (Ti-Pure ® R-900) | 60.00 | 60.00 |
| China clay (Optiwhite ® P) | 41.28 | 41.28 |
| Calcium carbonate (Duramite ®) | 84.46 | 84.46 |
| Silica 1160 | 72.85 | 72.85 |
| Texanol ® coalescent | 7.70 | 7.86 |
| Defoamer (Colloid 643) | 1.00 | 1.00 |
| Surfactant (Triton ® GR-7M) | 0.37 | 0.37 |
| Biocide (Nuosept ® 95) | 0.50 | 0.50 |
| Hydroxyethyl cellulose (Natrosol ® 250 MHR 2.5%) | 91.21 | 92.91 |
| Aqueous ammonia | 1.00 | 1.00 |
| Water | 62.81 | 60.17 |

Note: All quantities in grams 20% coalescent

EXAMPLE 11
SCRUB TEST

Each aqueous coating was cast with a 10 mil Dow bar on a black vinyl panel with a total of three replicates. The coating was dried at 75° F. and 50% relative humidity for one week.

The scrub test was performed on a Gardner machine Model 105A equipped with a metal tray with a ½ inch by 10 mil brass shim and nylon bristle brush.

Each panel was placed on the metal tray over the shim with coated side up and secured with clamps. Ten grams of an abrasive scrub medium (Leneta Abrasive Scrub Medium SC-2) and 5 milliliters of water were added to the nylon brush. The counter was set to zero and the test was begun. After each 400 cycles (before failure), an additional 10 grams of scrub medium and 5 milliliters of water were added to the brush.

Scrub resistance is reported as the number of cycles needed to remove the coating fully in one continuous line across the ½ inch width of the shim. Each test was run in duplicate. A third test was run if the first two tests were not within 25% repeatability. The scrub resistance value is the mean number of cycles to failure from all replicates run. The results are reported in Table 11.1.

TABLE 11.1

| PAINT | COALESCENT LEVEL | | | | |
|---|---|---|---|---|---|
| FORMULATION | 5%* | 10%* | 15%* | 20%* | 25%* |
| 1 | 4 | — | 5 | — | 11 |
| 2 | 9 | — | 19 | — | 155 |
| 3 | 14 | — | 182 | — | 403 |
| 4 | 155 | — | 195 | — | 291 |
| 5 | 143 | — | 226 | — | 185 |
| 6 | 59 | — | 252 | — | 379 |
| 7 | 226 | — | 246 | — | 245 |
| 8 | — | 103 | — | 149 | — |
| 9 | — | 75 | — | 175 | — |
| 10 | 93 | — | 100 | — | 87 |
| 11 | 130 | — | 96 | — | 131 |
| 12 | 98 | — | 162 | — | 175 |
| 13 | 221 | — | 282 | — | 306 |

*Note:
Suffix designation "A" is 5% coalescent level (Comparatives)
Suffix designation "B" is 15% coalescent level
Suffix designation "C" is 25% coalescent level
Suffix designation "D" is 10% coalescent level
Suffix designation "E" is 20% coalescent level Table 11.1 demonstrates that the addition of coalescent to the paint formulations containing polymeric binder whose $T_g$ is greater than about 20° C. improves scrub resistance. This improved scrub resistance is indicative of the improved integrity of the paint film which would not have been possible for these paint formulations containing polymeric binder with $T_g$'s greater than about 20° C. without the use of increased levels of coalescent because of their inability to form a film.

We claim:

1. A method of improving the scrub resistance of a paint containing at least one polymeric binder having a glass transition temperature greater than about 20° C. and an average particle size diameter of from about 70 nanometers to about 150 nanometers when said binder is formed from at least one acrylic monomer, said improvement comprising adding to said paint containing said binder, at least one coalescent at a concentration of about 10% to about 35% by weight based on the weight of the polymeric binder and where said coalescent is a solvent for the polymeric binder.

2. A method of improving the scrub resistance of a paint containing at least one polymeric binder having a glass transition temperature greater than about 20° C. and an average particle size diameter of from about 100 nanometers to about 250 nanometers when said binder is formed from at least 50% by weight of vinyl acetate, said improvement comprising adding to said paint containing said binder, at least one coalescent at a concentration of about 10% to about 35% by weight based on the weight of the polymeric binder and where said coalescent is a solvent for the polymeric binder.

3. A method of improving the scrub resistance of a flat latex paint containing a pigment volume concentration of from about 50 to about 90 and at least one polymeric binder having a glass transition temperature greater than about 20° C. and an average particle size diameter of from about 70 nanometers to about 150 nanometers when said binder is formed from at least one acrylic monomer, said improvement comprising adding to said paint containing said binder, at least one coalescent at a concentration of about 10% to about 35% by weight based on the weight of the polymeric binder and where said coalescent is a solvent for the polymeric binder.

4. A method of improving the scrub resistance of a flat latex paint containing a pigment volume concentration of from about 50 to about 90 and at least one polymeric binder having a glass transition temperature greater than about 20° C. and an average particle size diameter of from about 100 nanometers to about 250 nanometers when said binder is formed from at least 50% by weight of vinyl acetate, said improvement comprising adding to said paint containing said binder, at least one coalescent at a concentration of about 10% to about 35% by weight based on the weight of the polymeric binder and where said coalescent is a solvent for the polymeric binder.

5. A paint comprising:
(a) at least one polymeric binder having a glass transition temperature greater than about 20° C. and an average particle size diameter of from about 70 nanometers to about 150 nanometers when said binder is formed from at least one acrylic monomer; and
(b) at least one coalescent at a concentration of about 10% to about 35% by weight based on the weight of the polymeric binder and where said coalescent is a solvent for the polymeric binder.

6. A paint comprising:
(a) at least one polymeric binder having a glass transition temperature greater than about 20° C. and an average particle size diameter of from about 100 nanometers to about 250 nanometers when said binder is formed from at least 50% by weight of vinyl acetate; and
(b) at least one coalescent at a concentration of about 10% to about 35% by weight based on the weight of the polymeric binder and where said coalescent is a solvent for the polymeric binder.

7. A flat latex paint comprising:
(a) at least one polymeric binder having a glass transition temperature greater than about 20° C. and an average particle size diameter of from about 70 nanometers to about 150 nanometers when said binder is formed from at least one acrylic monomer;
(b) at least one coalescent at a concentration of about 10% to about 35% by weight based on the weight of the polymeric binder and where said coalescent is a solvent for the polymeric binder; and
(c) a pigment volume concentration of from about 50 to about 90.

8. A flat latex paint comprising:
(a) at least one polymeric binder having a glass transition temperature greater than about 20° C. and an average particle size diameter of from about 100 nanometers to about 250 nanometers when said binder is formed from at least 50% by weight of vinyl acetate;
(b) at least one coalescent at a concentration of about 10% to about 35% by weight based on the weight of the polymeric binder and where said coalescent is a solvent for the polymeric binder;
(c) a pigment volume concentration of from about 50 to about 90.

* * * * *